United States Patent
Liu et al.

(10) Patent No.: US 11,792,514 B2
(45) Date of Patent: Oct. 17, 2023

(54) METHOD AND APPARATUS FOR STABILIZING IMAGE, ROADSIDE DEVICE AND CLOUD CONTROL PLATFORM

(71) Applicant: Apollo Intelligent Connectivity (Beijing) Technology Co., Ltd., Beijing (CN)

(72) Inventors: Bo Liu, Beijing (CN); Jinrang Jia, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 50 days.

(21) Appl. No.: 17/505,770

(22) Filed: Oct. 20, 2021

(65) Prior Publication Data
US 2022/0038627 A1 Feb. 3, 2022

(30) Foreign Application Priority Data
Mar. 10, 2021 (CN) .......................... 202110261000.7

(51) Int. Cl.
*H04N 23/68* (2023.01)
*G08G 1/095* (2006.01)
*G08G 1/097* (2006.01)

(52) U.S. Cl.
CPC ......... *H04N 23/6811* (2023.01); *G08G 1/095* (2013.01); *G08G 1/097* (2013.01); *H04N 23/683* (2023.01)

(58) Field of Classification Search
None
See application file for complete search history.

(56) References Cited

U.S. PATENT DOCUMENTS

| 2007/0263096 A1 | 11/2007 | Bouzar |
| 2014/0362222 A1* | 12/2014 | Swaminathan ...... G08G 1/0116 348/149 |
| 2017/0257573 A1 | 9/2017 | Abe |
| 2018/0084196 A1* | 3/2018 | Saitwal ................... G06T 7/246 |

(Continued)

FOREIGN PATENT DOCUMENTS

| CN | 107123144 A | 9/2017 |
| CN | 109035331 A | 12/2018 |

(Continued)

OTHER PUBLICATIONS

English translation of JP-2016000598-A, Kondo, 2016 (Year: 2016).*

(Continued)

*Primary Examiner* — James M Hannett
(74) *Attorney, Agent, or Firm* — Ice Miller LLP (57) ABSTRACT

A method and an apparatus for stabilizing an image, a roadside device, and a cloud control platform are provided. The method may include: calculating, for a current image in an image sequence, a first offset between each image stabilization box of the current image and a corresponding image stabilization box of a template image; adding a first offset meeting a first preset condition to an observation list of a corresponding image stabilization box of the template image until there is an observation list meeting a second preset condition; and determining a position of the signal light of the current image, based on a first offset in an observation list of at least one image stabilization box and a position of the signal light of the template image.

18 Claims, 3 Drawing Sheets

(56) References Cited

U.S. PATENT DOCUMENTS

2018/0307925 A1    10/2018  Wisniowski et al.
2022/0198743 A1 *   6/2022  Liu ........................ G06T 7/246

FOREIGN PATENT DOCUMENTS

| CN | 109215364 A | | 1/2019 | | |
|---|---|---|---|---|---|
| CN | 110276738 A | | 9/2019 | | |
| CN | 110992725 A | | 4/2020 | | |
| CN | 111612760 A | | 9/2020 | | |
| CN | 111988611 A | | 11/2020 | | |
| CN | 112150558 A | | 12/2020 | | |
| EP | 1117251 A1 | | 7/2001 | | |
| EP | 1549047 B1 | * | 10/2012 | ............... | G06T 7/20 |
| EP | 3968266 A1 | * | 3/2022 | ......... | G06K 9/00785 |
| JP | 2007334746 A | | 12/2007 | | |
| JP | 2016000598 A | * | 1/2016 | | |

OTHER PUBLICATIONS

Liu Jing et al.; "Algorithm research of visual accurate alignment for substation inspection robot"; 1000-0682 (Jun. 2019) 06-0008-06, with English abstract (6 pages).

Xiaofang Kong et al.; "Particle filter-based vehicle tracking via HOG features after image stabilisation in intelligent drive system"; IET Intell. Transp. Sys., 2019, vol. 13, Iss. 6, pp. 942-949; The Institution of Engineering and Technology; ISSN: 1751-956X (8 pages).

Takasawa Ryuke et al.; "Signal position detection and color state recognition"; Fixed View Videos; Imaging Laboratory 2019.0363; Finishing No. INS-011JPP sending No. 559188; Nov. 8, 2004; with machine translation (14 pages).

Extended European Search Report for European Patent Application No. 21203548.9, dated Mar. 28, 2022 (9 pages).

* cited by examiner

METHOD AND APPARATUS FOR STABILIZING IMAGE, ROADSIDE DEVICE AND CLOUD CONTROL PLATFORM

CROSS-REFERENCE TO RELATED APPLICATIONS

This application claims the priority of Chinese Patent Application No. 202110261000.7, titled "METHOD AND APPARATUS FOR STABILIZING IMAGE, ROADSIDE DEVICE AND CLOUD CONTROL PLATFORM", filed on Mar. 10, 2021, the content of which is incorporated herein by reference in its entirety.

TECHNICAL FIELD

Embodiments of the present disclosure relate to the field of computer technology, in particular to the technical field of artificial intelligence such as intelligent transportation and computer vision, and more in particular to a method and apparatus for stabilizing an image, a roadside device, and a cloud control platform.

BACKGROUND

Roadside perception is to capture data for analysis by setting up sensor devices on the roadside such as setting up cameras on signal light poles or monitoring light poles. When color recognition is performed on signal lights in the roadside perception, since positions of the signal lights relative to a camera remain unchanged, a box of image of the signal lights taken by the camera is acquired in advance, and the positions of the signal lights are manually labeled. In actual detection, based on the pre-labeled positions of the signal lights, image matting is directly performed for recognition in the image. However, if the signal lights or the camera moves slightly, it may cause the relative positions between the camera and the signal lights to change. Therefore, a method for stabilizing an image is needed to correct position offsets.

At present, the commonly used method for stabilizing an image is offset correction based on feature point matching. Specifically, for a certain box of historical image, the position of the signal light (x1, y1, x2, y2) in the historical image is determined, and feature points (such as SIFT features, or HOG features) corresponding to the position of the signal light are extracted. For each next box of image, (x1, y1, x2, y2) is expanded outwards partly, and feature points are extracted using the same feature extraction method, and then the feature points are matched. Based on matched feature points, an offset of a position of a signal light of a current image relative to the position of the signal light of the historical image is calculated.

SUMMARY

Embodiments of the present disclosure propose a method and apparatus for stabilizing an image, a roadside device, and a cloud control platform.

In a first aspect, embodiments of the present disclosure provide a method for stabilizing an image, and the method includes: calculating, for a current image in an image sequence, a first offset between each image stabilization box of the current image and a corresponding image stabilization box of at least one image stabilization box of a template image; adding a first offset meeting a first preset condition to an observation list of the corresponding image stabilization box of the template image until there is an observation list meeting a second preset condition, the first preset condition being that the first offset is not greater than a preset offset threshold; and determining a position of a signal light of the current image, based on the first offset in the observation list of the at least one image stabilization box and a position of a signal light of the template image.

In a second aspect, embodiments of the present disclosure provide an apparatus for stabilizing an image, and the apparatus includes: a calculation module configured to calculate, for a current image in an image sequence, a first offset between each image stabilization box of the current image and a corresponding image stabilization box of at least one image stabilization box of a template image; an adding module configured to add a first offset meeting a first preset condition to an observation list of the corresponding image stabilization box of the template image until there is an observation list meeting a second preset condition, the first preset condition being that the first offset is not greater than a preset offset threshold; and a determination module configured to determine a position of a signal light of the current image, based on a first offset in the observation list of the at least one image stabilization box and a position of a signal light of the template image.

In a third aspect, embodiments of the present disclosure provide an electronic device, including: at least one processor; and a memory, communicatively connected to the at least one processor, where the memory stores instructions executable by the at least one processor, and the instructions, when executed by the at least one processor, cause the at least one processor to perform the method as described in any one of the implementations of the first aspect.

In a fourth aspect, embodiments of the present disclosure provide a non-transitory computer readable storage medium storing computer instructions, the computer instructions being used to cause a computer to perform the method as described in any one of the implementations of the first aspect.

In a fifth aspect, embodiments of the present disclosure provide a computer program product including a computer program, where the computer program, when executed by a processor, implements the method as described in any one of the implementations of the first aspect.

In a sixth aspect, embodiments of the present disclosure provide a roadside device including the electronic device according to the third aspect.

In a seventh aspect, embodiments of the present disclosure provide a cloud control platform including the electronic device according to the third aspect.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

By reading detailed description of non-limiting embodiments with reference to the following accompanying drawings, other features, objectives and advantages of the present disclosure will become more apparent. The accompanying drawings are used to provide a better understanding of the present solution, and do not constitute a limitation to the present disclosure.

DETAILED DESCRIPTION OF EMBODIMENTS

The following describes example embodiments of the present disclosure in conjunction with the accompanying drawings, where various details of the embodiments of the present disclosure are included to facilitate understanding, and should be considered as examples only. Therefore, those of ordinary skills in the art should recognize that various changes and modifications may be made to the embodiments described herein without departing from the scope and spirit of the present disclosure. Also, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
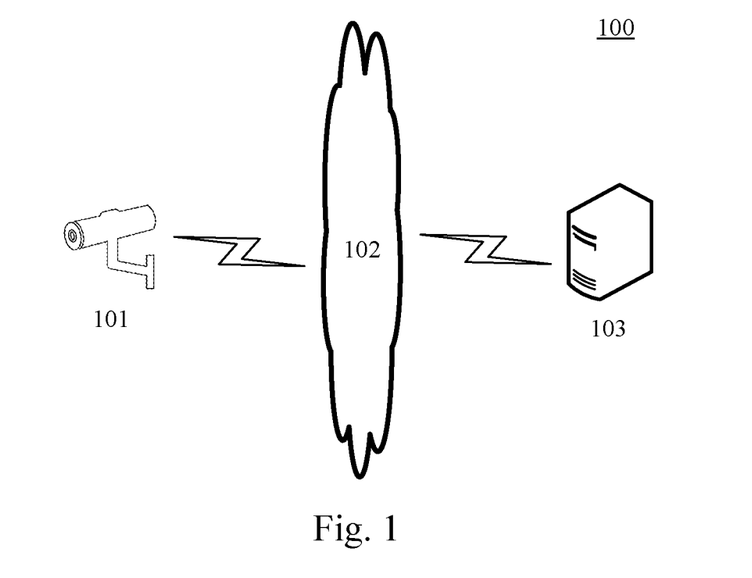
FIG. 1 is an example system architecture diagram to which the present disclosure may be applied.

FIG. 1 shows an example system architecture 100 to which an embodiment of a method for stabilizing an image or an apparatus for stabilizing an image of the present disclosure may be applied.

As shown in FIG. 1, the system architecture 100 may include a camera 101, a network 102 and a server 103. The network 102 serves as a medium for providing a communication link between the camera 101 and the server 103. The network 102 may include various types of connections, such as wired or wireless communication links, or optic fiber cables.

The camera 101 may interact with the server 103 through the network 102 to receive or send messages, and so on.

The camera 101 generally refers to a camera device set up on the roadside and capable of acquiring images of a signal light, such as a camera set up on a signal light pole or a monitoring light pole at an intersection. The camera is set up on the signal light pole or the monitoring light pole, and may move slightly due to thermal expansion and contraction of the light pole, sinking of the ground, loose installation of the camera, etc., thereby resulting in a change in a relative position between the camera and the signal light. The objective of the present disclosure is to provide a method for stabilizing an image, to correct position offsets.

The server 103 may provide various services. For example, the server 103 may process such as analyze an image sequence and other data acquired from the camera 101, to generate a processing result (for example, a position of a signal light of a current image).

It should be noted that the server may be hardware or software. When the server is hardware, the server may be implemented as a distributed server cluster composed of a plurality of servers, or as a single server. When the server is software, the server may be implemented as a plurality of software pieces or software modules (for example, a plurality of software pieces or software modules for providing distributed services), or may be implemented as a single software piece or software module, which is no limited herein.

In addition, the server 103 may alternatively be replaced by a roadside device (for example, a roadside computing device RSCU), a cloud control platform, and the like.

It should be noted that the method for stabilizing an image provided by the embodiments of the present disclosure is generally performed by the server, the roadside device, the cloud control platform, etc. Correspondingly, the apparatus for stabilizing an image is generally provided in the server, the roadside device, the cloud control platform, etc.

It should be understood that the number of the camera, the network, and the server in FIG. 1 is merely illustrative. According to the implementation needs, there may be any number of cameras, networks, and servers.

Figure 2:
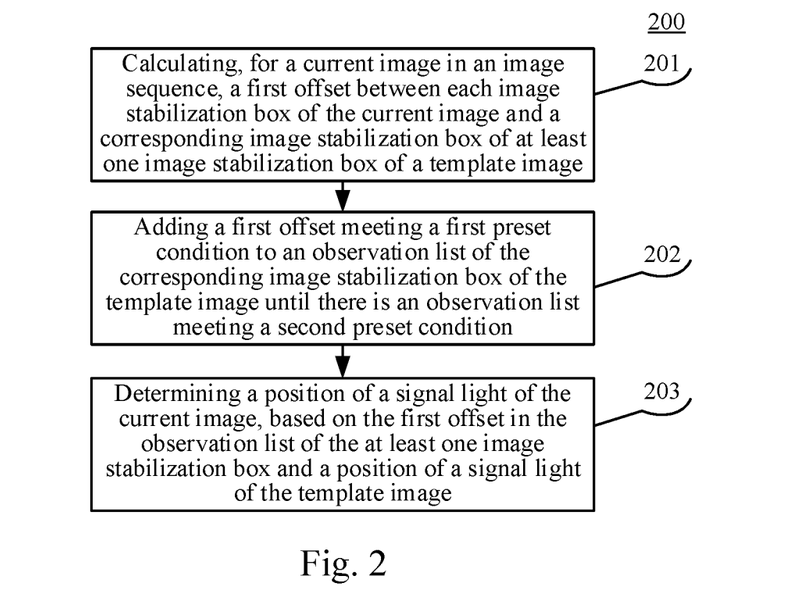
FIG. 2 is a flowchart of an embodiment of a method for stabilizing an image according to the present disclosure.

With further reference to FIG. 2, a flow 200 of an embodiment of a method for stabilizing an image according to the present disclosure is shown. The method for stabilizing an image includes the following steps 201 to 203.

Step 201 includes calculating, for a current image in an image sequence, a first offset between each image stabilization box of the current image and a corresponding image stabilization box of at least one image stabilization box of a template image.

In the present embodiment, an executing body of the method for stabilizing an image (for example, the server 103 shown in FIG. 1) may receive the image sequence acquired by the executing body itself in real time from a camera (for example, the camera 101 shown in FIG. 1) set up on the roadside. For the current image in the image sequence, the executing body may calculate the first offset between each image stabilization box of the current image and the corresponding image stabilization box of at least one image stabilization box of the template image.

A signal light generally refers to a road traffic signal light, which is installed at an intersection such as a crossroad or a T-junction, and is controlled by a road traffic signal controller to guide a vehicle and a pedestrian to pass in a safe and orderly way.

Generally, the camera is set up on the roadside signal light such as on a signal light pole or a monitoring light pole at an intersection, and is capable of acquiring images of the signal light. The camera may acquire the images periodically and send the images to the executing body in real time. Based on acquisition time, a series of images acquired by the camera may form an image sequence. The executing body may sequentially process the images in the image sequence based on the acquisition time.

For the current image in the image sequence, the executing body may first use a target detection algorithm to detect the image stabilization box of the current image, and then subtract a position of an image stabilization box of the current image from a position of an image stabilization box of the template image, to obtain the first offset between the image stabilization box of the current image and the image stabilization box of the at least one image stabilization box of the template image. Here, the template image may be an image of the signal light acquired by the camera in advance, and positions of the signal light and the image stabilization box are labeled on the image. In order to avoid the problems of noise and overexposure and ensure a labeling accuracy, the template image may be an image acquired by the camera during the day. The image stabilization box may be a rectangular box on the road, and in order to facilitate detection, a crossing point of road markings may be included in the image stabilization box. In order to improve a detection accuracy, the number of image stabilization boxes may be multiple. The positions of the signal light and the image stabilization box may be coordinates of the signal light and the image stabilization box in a preset coordinate system, such as coordinates of an upper left corner point and a lower right corner point of a boundary box of the signal light and coordinates of an upper left corner point and a lower right corner point of the image stabilization box in a pixel coordinate system. The pixel coordinate system refers to a coordinate system of a visualized picture, and generally, an upper left corner of the coordinate system is an origin, and a lower right direction is a positive direction.

Step 202 includes adding a first offset meeting a first preset condition to an observation list of the corresponding image stabilization box of the template image until there is an observation list meeting a second preset condition.

In the present embodiment, the executing body may add the first offset meeting the first preset condition to the observation list of the corresponding image stabilization box of the template image until there is the observation list meeting the second preset condition.

Generally, an image, corresponding to the first offset meeting the first preset condition, has a high image similarity with the template image. For example, the first preset condition may be that the first offset is not greater than a preset offset threshold. The smaller the offset between images is, the higher the similarity between the images is. Here, the first offset meeting the first preset condition is added to the observation list of the corresponding image stabilization box. An image, corresponding to a first offset not meeting the first preset condition, is filtered. In addition, it is necessary for the number of images having the first offset added to the observation list to accumulate to a certain number, to ensure that a calculated position of the signal light of the current image has a high accuracy. If there is an observation list meeting the second preset condition, it indicates that a sufficient number of images are accumulated. For example, the second preset condition may be that a length of an observation list is not smaller than a preset length threshold. The longer an observation list is, the more images are accumulated in the observation list. One image stabilization box of the template image may correspond to one observation list, and when one or more observation lists meet the second preset condition, there is the observation list meeting the second preset condition.

It should be noted that if the number of images having the first offset added to the observation list is accumulated sufficiently, whenever a new first offset is added to the observation list, an earliest first offset added to the observation list may be deleted, which can avoid interference of early images and improve an accuracy of the calculated position of the signal light.

Step 203 includes determining a position of a signal light of the current image, based on the first offset in the observation list of the at least one image stabilization box and a position of a signal light of the template image.

In the present embodiment, the executing body may determine the position of the signal light of the current image, based on the first offset in the observation list of the at least one image stabilization box and the position of the signal light of the template image.

Generally, the executing body may mainly use the following three image stabilization strategies to determine the position of the signal light of the current image.

The first one is a signal light image stabilization strategy based on homography matrix transformation, and specific steps are as follows.

First, a homography matrix from an image stabilization box of the template image to an image stabilization box of the current image is calculated.

Taking any image stabilization box as an example, based on a position of an image stabilization box of the template image and a position of an image stabilization box of the current image, the homography matrix from the image stabilization box of the template image to the image stabilization box of the current image may be calculated. A calculation formula of the homography matrix is as follows:

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix};$$

Here, (x', y', 1) is the position of the image stabilization box of the current image, (x,y,1) is the position of the image stabilization box of the template image, and $$\begin{bmatrix} h_{11} & h_{12} & h_{13} \\ h_{21} & h_{22} & h_{23} \\ h_{31} & h_{32} & 1 \end{bmatrix}$$

is the homography matrix.

Then, the position of the signal light of the template image is multiplied by the homography matrix to obtain the position of the signal light of the current image.

It should be noted that the position of the image stabilization box of the current image may be detected using the target detection algorithm. In order to improve a calculation accuracy, the position of the image stabilization box of the current image may alternatively be calculated by using the first offset in the observation list of the image stabilization box and the position of the image stabilization box of the template image. For example, a mean value of the first offset in the observation list of the image stabilization box is calculated as an offset between the image stabilization box of the current image and the image stabilization box of the template image, and then the offset between the image stabilization boxes is subtracted from the position of the image stabilization box of the template image to obtain the position of the image stabilization box of the current image.

The signal light image stabilization strategy based on the nomography matrix transformation is used for image stabilization, and observation lists of all image stabilization boxes are used for calculation, so that an accuracy of an image stabilization effect can be improved.

The second one is a nearest signal light image stabilization strategy, and specific steps are as follows.

First, a nearest image stabilization box of the position of the signal light of the template image.

Specifically, a distance between center coordinates of the signal light in one direction and center coordinates of each image stabilization box is calculated. A closest image stabilization box is the nearest image stabilization box of the signal light. When there is one signal light in one direction of an intersection, the center coordinates of the signal light are the center coordinates of the signal light in the direction. When there is a plurality of signal lights in one direction of an intersection, a center of the center coordinates of the plurality of signal lights is calculated as the center coordinates of the signal light in the direction.

Then, a mean value of the first offset in the observation list of the nearest image stabilization box is calculated as a second offset between the position of the signal light of the current image and the position of the signal light of the template image.

Since an offset between any stationary object of the current image and any corresponding stationary object of the template image is the same, an offset between an image stabilization box of the current image and a corresponding image stabilization box of the template image is equal to the offset between the signal light of the current image and the signal light of the template image.

Finally, the position of the signal light of the current image is determined based on the second offset and the position of the signal light of the template image.

Specifically, the second offset is subtracted from the position of the signal light of the template image to obtain the position of the signal light of the current image.

The nearest signal light image stabilization strategy is used for image stabilization, and only the observation list of the nearest image stabilization box is used for calculation, so that an amount of calculation can be reduced.

The third one is a mean value signal light image stabilization strategy, and specific steps are as follows.

First, a mean value of the first offset in an observation list of each image stabilization box is calculated as a second offset between the signal light of the current image and the signal light of the template image.

Since an offset between any stationary object of the current image and any corresponding stationary object of the template image is the same, an offset between an image stabilization box of the current image and a corresponding image stabilization box of the template image is equal to the offset between the signal light of the current image and the signal light of the template image.

Then, the position of the signal light of the current image is determined based on the second offset and the position of the signal light of the template image.

Specifically, the second offset is subtracted from the position of the signal light of the template image to obtain the position of the signal light of the current image.

The mean value signal light image stabilization strategy is used for image stabilization, and observation lists of all image stabilization boxes are used for calculation, so that an accuracy of an image stabilization effect can be improved.

According to the method for stabilizing an image provided by the embodiments of the present disclosure, for the current image in the image sequence, the first offset between each image stabilization box of the current image and the corresponding image stabilization box of the at least one image stabilization box of the template image is first calculated; then the first offset meeting the first preset condition is added to the observation list of the corresponding image stabilization box until there is the observation list meeting the second preset condition; and finally the position of the signal light of the current image is determined based on the first offset in the observation list of the at least one image stabilization box and the position of the signal light of the template image. The method for stabilizing an image is provided based on the image similarity, in which only the first offset meeting the first preset condition is added to the observation list, and the image having a low similarity is filtered, and thus the method can perform the image stabilization of the signal light based on the image having a high similarity, so that the image stabilization effect is improved. There is no need to extract features from the image, which can reduce the consumption of computing resources and shorten the time consuming of image stabilization. The method is hardly affected by illumination of a vehicle light, and improves the stability of the image stabilization effect.

Figure 3:
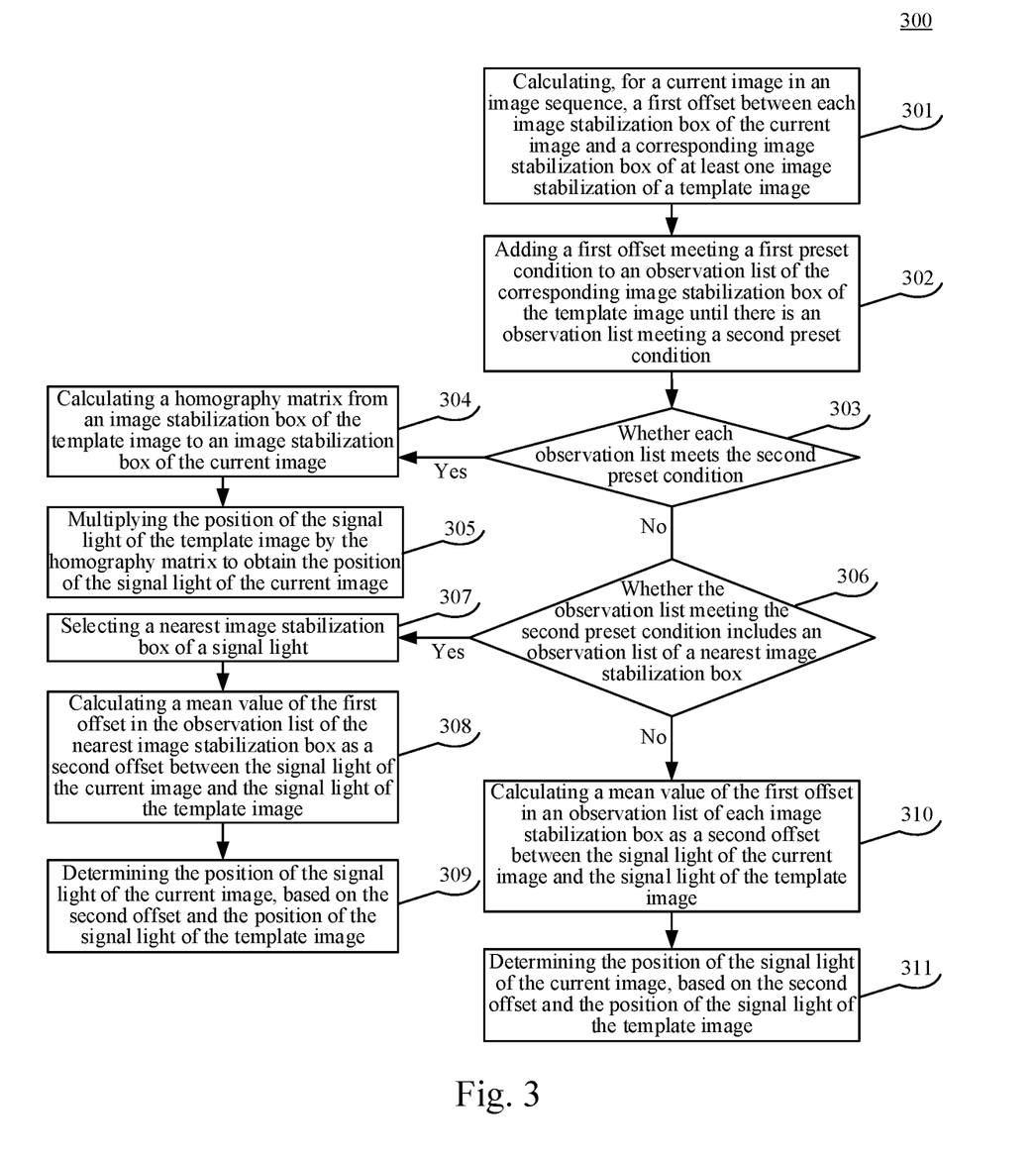
FIG. 3 is a flowchart of another embodiment of the method for stabilizing an image according to the present disclosure.

With further reference to FIG. 3, a flow 300 of another embodiment of the method for stabilizing an image is shown according to the present disclosure. The method for stabilizing an image includes the following steps 301 to 311.

Step 301 includes calculating, for a current image in an image sequence, a first offset between each image stabilization box of the current image and a corresponding image stabilization box of at least one image stabilization of a template image.

Step 302 includes adding a first offset meeting a first preset condition to an observation list of the corresponding image stabilization box of the template image until there is an observation list meeting a second preset condition.

In the present embodiment, the specific operations of steps 301-302 are described in detail in steps 201-202 in the embodiment shown in FIG. 2, and detailed description thereof will be omitted.

Step 303 includes determining whether each observation list meets the second preset condition.

In the present embodiment, an executing body of the method for stabilizing an image (for example, the server 103 shown in FIG. 1) may determine whether each observation list meets the second preset condition. If each observation list meets the second preset condition, the executing body may perform step 304, i.e., use a signal light image stabilization strategy based on homography matrix transformation for image stabilization; or if not every observation list meets the second preset condition, that is, the number of the observation list meeting the second preset condition is smaller than the number of all observation lists, the executing body may perform step 306.

Step 304 includes calculating a homography matrix from an image stabilization box of the template image to an image stabilization box of the current image.

In the present embodiment, if each observation list meets the second preset condition, the executing body may calculate the homography matrix from the image stabilization box of the template image to the image stabilization box of the current image.

Taking any image stabilization box as an example, based on a position of an image stabilization box of the template image and a position of an image stabilization box of the current image, the homography matrix from the image stabilization box of the template image to the image stabilization box of the current image may be calculated. A calculation formula of the homography matrix is as follows:

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix};$$

Here, (x', y', 1) is the position of the image stabilization box of the current image, (x, y, 1) is the position of the image stabilization box of the template image, and $$\begin{bmatrix} h_{11} & h_{12} & h_{13} \\ h_{21} & h_{22} & h_{23} \\ h_{31} & h_{32} & 1 \end{bmatrix}$$

is the homography matrix.

Step 305 includes multiplying the position of the signal light of the template image by the homography matrix to obtain the position of the signal light of the current image.

In the present embodiment, the executing body may multiply the position of the signal light of the template image by the homography matrix to obtain the position of the signal light of the current image.

Step 306 includes determining whether the observation list meeting the second preset condition includes an observation list of a nearest image stabilization box.

In the present embodiment, if the number of the observation list meeting the second preset condition is smaller than the number of all observation lists, the executing body may determine whether the observation list meeting the second preset condition includes the observation list of the nearest image stabilization box. If the observation list meeting the second preset condition includes the observation list of the nearest image stabilization box, the executing body may perform step 307, i.e., use a nearest signal light image stabilization strategy for image stabilization; or if the observation list meeting the second preset condition does not include the observation list of the nearest image stabilization box, the executing body may perform step 310, i.e., use a mean value signal light image stabilization strategy for image stabilization.

Step 307 includes selecting a nearest image stabilization box of a signal light.

In the present embodiment, if the observation list meeting the second preset condition includes the observation list of the nearest image stabilization box, the executing body may select the nearest image stabilization box of the signal light. Specifically, a distance between center coordinates of the signal light in one direction and center coordinates of each image stabilization box is calculated. A closest image stabilization box is the nearest image stabilization box of the signal light. When there is one signal light in one direction of an intersection, the center coordinates of the signal light are the center coordinates of the signal light in the direction. When there is a plurality of signal lights in one direction of an intersection, a center of the center coordinates of the plurality of signal lights is calculated as the center coordinates of the signal light in the direction.

Step 308 includes calculating a mean value of the first offset in the observation list of the nearest image stabilization box as a second offset between the signal light of the current image and the signal light of the template image.

In the present embodiment, the executing body may calculate the mean value of the first offset in the observation list of the nearest image stabilization box as the second offset between the signal light of the current image and the signal light of the template image.

Since an offset between any stationary object of the current image and any corresponding stationary object of the template image is the same, an offset between an image stabilization box of the current image and a corresponding image stabilization box of the template image is equal to the offset between the signal light of the current image and the signal light of the template image.

Step 309 includes determining the position of the signal light of the current image, based on the second offset and the position of the signal light of the template image.

In the present embodiment, the executing body may determine the position of the signal light of the current image, based on the second offset and the position of the signal light of the template image. Specifically, the second offset is subtracted from the position of the signal light of the template image to obtain the position of the signal light of the current image.

Step 310 includes calculating a mean value of the first offset in an observation list of each image stabilization box as a second offset between the signal light of the current image and the signal light of the template image.

In the present embodiment, if the observation list meeting the second preset condition does not include the observation list of the nearest image stabilization box, the executing body may calculate the mean value of the first offset in the observation list of each image stabilization box as the second offset between the signal light of the current image and the signal light of the template image.

Since an offset between any stationary object of the current image and any corresponding stationary object of the template image is the same, an offset between an image stabilization box of the current image and a corresponding image stabilization box of the template image is equal to the offset between the signal light of the current image and the signal light of the template image.

Step 311 includes determining the position of the signal light of the current image, based on the second offset and the position of the signal light of the template image.

In the present embodiment, the executing body may determine the position of the signal light of the current image, based on the second offset and the position of the signal light of the template image. Specifically, the second offset is subtracted from the position of the signal light of the template image to obtain the position of the signal light of the current image.

It can be seen from FIG. 3 that, compared with the embodiment corresponding to FIG. 2, the method for stabilizing an image in the present embodiment highlights the step of determining the position of the signal light. Thus, the solution described in the present embodiment selects the signal light image stabilization strategy based on the nomography matrix transformation for image stabilization when each observation list meets the second preset condition; the solution described in the present embodiment selects the nearest signal light image stabilization strategy for image stabilization, when the number of the observation list meeting the second preset condition is smaller than the number of all observation lists, and the observation list meeting the second preset condition includes the observation list of the nearest image stabilization box; or the solution described in the present embodiment selects the mean value signal light image stabilization strategy for image stabilization, when the number of the observation list meeting the second preset condition is smaller than the number of all observation lists, and the observation list meeting the second preset condition does not include the observation list of the nearest image stabilization box of the signal light. The corresponding image stabilization strategy is selected based on the observation list, so that not only the amount of calculation is reduced, but also the accuracy of the image stabilization effect is improved.

Figure 4:
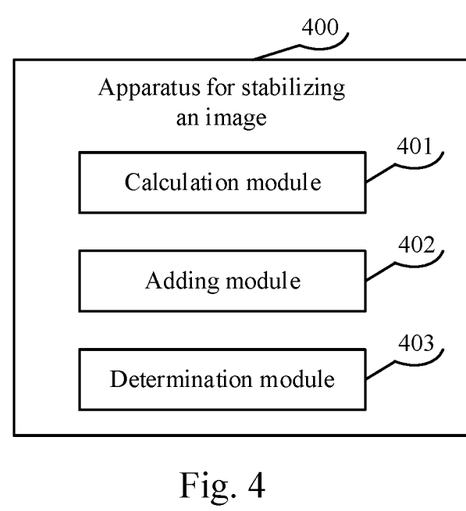
FIG. 4 is a schematic structural diagram of an embodiment of an apparatus for stabilizing an image according to the present disclosure.

With further reference to FIG. 4, as an implementation of the method shown in the above figures, the present disclosure provides an embodiment of an apparatus for stabilizing an image. The apparatus embodiment corresponds to the method embodiment as shown in FIG. 2. The apparatus may be applied to various electronic devices.

As shown in FIG. 4, an apparatus 400 for stabilizing an image of the present embodiment may include: a calculation module 401, an adding module 402 and a determination module 403. The calculation module 401 is configured to calculate, for a current image in an image sequence, a first offset between each image stabilization box of the current image and a corresponding image stabilization box of at least one image stabilization box of a template image. The adding module 402 is configured to add a first offset meeting a first preset condition to an observation list of the corresponding image stabilization box of the template image until there is an observation list meeting a second preset condition, the first preset condition being that the first offset is not greater than a preset offset threshold. The determination module 403 is configured to determine a position of a signal light of the current image, based on the first offset in the observation list of the at least one image stabilization box and a position of a signal light of the template image.

In the present embodiment, in the apparatus 400 for stabilizing an image, for the specific processing and the technical effects of the calculation module 401, the adding module 402, and the determination module 403, reference may be made to the relevant descriptions of steps 201-203 in the corresponding embodiment of FIG. 2 respectively, and detailed description thereof will be omitted.

In some alternative implementations of the present embodiment, the determination module 403 is further configured to: calculate a homography matrix from an image stabilization box of the template image to an image stabilization box of the current image; and multiply the position of the signal light of the template image by the homography matrix to obtain the position of the signal light of the current image.

In some alternative implementations of the present embodiment, each observation list meets the second preset condition.

In some alternative implementations of the present embodiment, the determination module 403 is further configured to: select a nearest image stabilization box of the position of the signal light of the template image; calculate a mean value of the first offset in the observation list of the nearest image stabilization box as a second offset between the position of the signal light of the current image and the position of the signal light of the template image; and determine the position of the signal light of the current image, based on the second offset and the position of the signal light of the template image.

In some alternative implementations of the present embodiment, the number of the observation list meeting the second preset condition is smaller than the number of all observation lists, and the observation list meeting the second preset condition includes the observation list of the nearest image stabilization box.

In some alternative implementations of the present embodiment, the determination module 403 is further configured to: calculate a mean value of the first offset in the observation list of each image stabilization box of the template image as a second offset between the position of the signal light of the current image and the position of the signal light of the template image; and determine the position of the signal light of the current image, based on the second offset and the position of the signal light of the template image.

In some alternative implementations of the present embodiment, the number of an observation list meeting the second preset condition is smaller than the number of all observation lists, and the observation list meeting the second preset condition does not include an observation list of a nearest image stabilization box of the position of the signal light of the template image.

In some alternative implementations of the present embodiment, the second preset condition is that a length of an observation list is not smaller than a preset length threshold.

According to embodiments of the present disclosure, the present disclosure further provides an electronic device, a readable storage medium and a computer program product.

Figure 5:
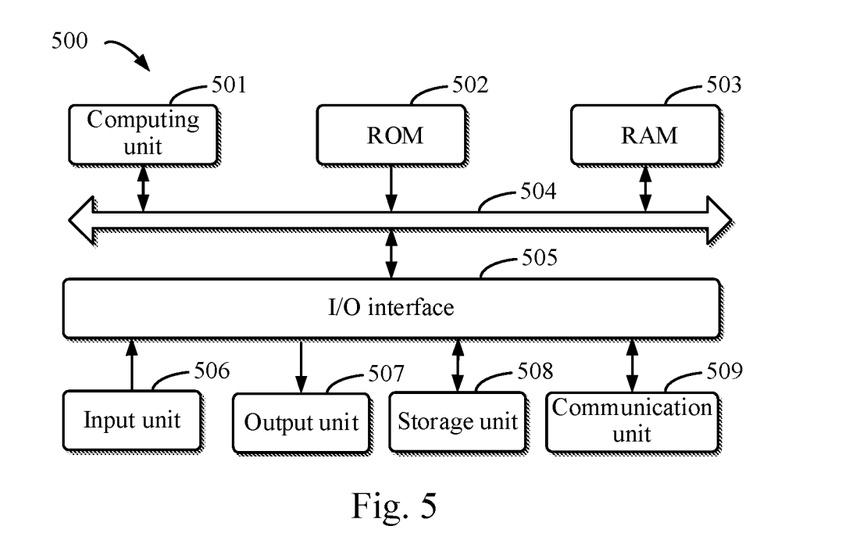
FIG. 5 is a block diagram of an electronic device used to implement the method for stabilizing an image according to an embodiment of the present disclosure.

FIG. 5 shows a schematic block diagram of an electronic device 500 adapted to implement embodiments of the present disclosure. The electronic device is intended to represent various forms of digital computers, such as laptops, desktops, worktables, personal digital assistants, servers, blade servers, mainframe computers and other suitable computers. The electronic device may alternatively represent various forms of mobile devices, such as personal digital processing, cellular phones, smart phones, wearable devices and other similar computing devices. The components, their connections and relationships, and their functions shown herein are examples only, and are not intended to limit the implementations of the present disclosure as described and/or claimed herein.

As shown in FIG. 5, the device 500 may include a computing unit 501, which may execute various appropriate actions and processes in accordance with a computer program stored in a read-only memory (ROM) 502 or a computer program loaded into a random-access memory (RAM) 503 from a storage unit 508. The RAM 503 may alternatively store various programs and data required by operations of the device 500. The computing unit 501, the ROM 502 and the RAM 503 are connected to each other through a bus 504. An input/output (I/O) interface 505 is also connected to the bus 504.

Multiple components of the device 500 are connected to the I/O interface 505, and include: an input unit 506, such as a keyboard and a mouse; an output unit 507, such as various types of displays and a speaker; a storage unit 508, such as a magnetic disk and an optical disk; and a communication unit 509, such as a network card, a modem and a wireless communication transceiver. The communication unit 509 allows the device 500 to exchange information or data with other devices through a computer network, such as the Internet and/or various telecommunications networks.

The computing unit 501 may be various general-purpose and/or specific-purpose processing components having processing and computing capabilities. Some examples of the computing unit 501 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 501 performs various methods and processing described above, such as the method for stabilizing an image. For example, in some embodiments, the method for stabilizing an image may be implemented as a computer software program, which is tangibly included in a machine-readable medium, such as the storage unit 508. In some embodiments, part or all of the computer program may be loaded and/or installed on the device 500 through the ROM 502 and/or the communication unit 509. When the computer program is loaded into the RAM 503 and executed by the computing unit 501, one or more steps of the method for stabilizing an image described above may be performed. Alternatively, in other embodiments, the computing unit 501 may be configured to perform the method for stabilizing an image in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other.

According to embodiments of the present disclosure, the present disclosure further provides a roadside device. The roadside device may include the electronic device shown in FIG. 5. Alternatively, in addition to the electronic device, the roadside device may include a communication component, etc. The electronic device may be integrated with the communication component, or the electronic device and the communication component may be provided separately. The electronic device may acquire data, such as a picture and a video, from a sensing device (such as a roadside camera), to perform image and video processing and data calculation. Alternatively, the electronic device itself, such as an AI camera, may alternatively have a sensing data acquisition function and a communication function, and the electronic device may directly perform image and video processing and data calculation based on acquired sensing data.

According to embodiments of the present disclosure, the present disclosure further provides a cloud control platform. The cloud control platform may include the electronic device shown in FIG. 5. Alternatively, the cloud control platform performs processing in the cloud. The electronic device included in the cloud control platform may acquire data, such as a picture and a video, from a sensing device (such as a roadside camera), to perform image and video processing and data calculation; and the cloud control platform may alternatively be called as a vehicle-road collaborative management platform, an edge computing platform, a cloud computing platform, a central system, a cloud server, etc.

It should be appreciated that the steps of reordering, adding or deleting may be executed using the various forms shown above. For example, the steps described in the present disclosure may be executed in parallel or sequentially or in a different order, so long as the expected results of the technical schemas provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for stabilizing an image, the method comprising:
   calculating, for a current image in an image sequence, a first offset between each image stabilization box of the current image and a corresponding image stabilization box of at least one image stabilization box of a template image;

adding the first offset meeting a first preset condition to an observation list of the corresponding image stabilization box of the template image until there is an observation list meeting a second preset condition, the first preset condition being that the first offset is not greater than a preset offset threshold; and determining a position of a signal light of the current image, based on the first offset in the observation list of the at least one image stabilization box and a position of a signal light of the template image;

wherein the method further comprises: determining whether each observation list meets the second preset condition, and determining a position of a signal light of the current image, based on the first offset in the observation list of the at least one image stabilization box and a position of a signal light of the template image further comprises:

in response to determining that at least one observation list does not meet the second preset condition, determining whether the observation list meeting the second preset condition includes an observation list of a nearest image stabilization box;

in response to determining that the observation list meeting the second preset condition includes an observation list of a nearest image stabilization box, selecting a nearest image stabilization box of the position of the signal light of the template image;

calculating a mean value of the first offset in the observation list of the nearest image stabilization box as a second offset between the position of the signal light of the current image and the position of the signal light of the template image; and determining the position of the signal light of the current image, based on the second offset and the position of the signal light of the template image.

2. The method according to claim 1, wherein determining the position of the signal light of the current image, based on the first offset in the observation list of the at least one image stabilization box and the position of the signal light of the template image, further comprises:

in response to determining that each observation list meets the second preset condition, calculating a homography matrix from an image stabilization box of the template image to an image stabilization box of the current image; and multiplying the position of the signal light of the template image by the homography matrix to obtain the position of the signal light of the current image.

3. The method according to claim 2, wherein each observation list meets the second preset condition.

4. The method according to claim 1, wherein a number of an observation list meeting the second preset condition is smaller than a number of all observation lists, and the observation list meeting the second preset condition comprises the observation list of the nearest image stabilization box.

5. The method according to claim 1, wherein determining the position of the signal light of the current image, based on the first offset in the observation list of the at least one image stabilization box and the position of the signal light of the template image, further comprises:

in response to determining that the observation list meeting the second preset condition does not include an observation list of a nearest image stabilization box, calculating a mean value of the first offset in the observation list of each image stabilization box of the template image as a second offset between the position of the signal light of the current image and the position of the signal light of the template image; and determining the position of the signal light of the current image, based on the second offset and the position of the signal light of the template image.

6. The method according to claim 5, wherein a number of an observation list meeting the second preset condition is smaller than a number of all observation lists, and the observation list meeting the second preset condition does not comprise an observation list of a nearest image stabilization box of the position of the signal light of the template image.

7. The method according to claim 1, wherein the second preset condition is that a length of an observation list is not smaller than a preset length threshold.

8. An electronic device, comprising:

at least one processor; and a memory, communicatively connected to the at least one processor; wherein, the memory stores instructions executable by the at least one processor, and the instructions, when executed by the at least one processor, cause the at least one processor to perform operations comprising:

calculating, for a current image in an image sequence, a first offset between each image stabilization box of the current image and a corresponding image stabilization box of at least one image stabilization box of a template image;

adding a first offset meeting a first preset condition to an observation list of the corresponding image stabilization box of the template image until there is an observation list meeting a second preset condition, the first preset condition being that the first offset is not greater than a preset offset threshold; and determining a position of a signal light of the current image, based on the first offset in the observation list of the at least one image stabilization box and a position of a signal light of the template image;

wherein the operations further comprise: determining whether each observation list meets the second preset condition, and determining a position of a signal light of the current image, based on the first offset in the observation list of the at least one image stabilization box and a position of a signal light of the template image further comprises:

in response to determining that at least one observation list does not meet the second preset condition, determining whether the observation list meeting the second preset condition includes an observation list of a nearest image stabilization box;

in response to determining that the observation list meeting the second preset condition includes an observation list of a nearest image stabilization box, selecting a nearest image stabilization box of the position of the signal light of the template image;

calculating a mean value of the first offset in the observation list of the nearest image stabilization box as a second offset between the position of the signal light of the current image and the position of the signal light of the template image; and determining the position of the signal light of the current image, based on the second offset and the position of the signal light of the template image.

9. The electronic device according to claim 8, wherein determining the position of the signal light of the current image, based on the first offset in the observation list of the at least one image stabilization box and the position of the signal light of the template image, further comprises:

in response to determining that each observation list meets the second preset condition, calculating a homography matrix from an image stabilization box of the template image to an image stabilization box of the current image; and multiplying the position of the signal light of the template image by the homography matrix to obtain the position of the signal light of the current image.

10. The electronic device according to claim 9, wherein each observation list meets the second preset condition.

11. The electronic device according to claim 9, wherein a number of an observation list meeting the second preset condition is smaller than a number of all observation lists, and the observation list meeting the second preset condition comprises the observation list of the nearest image stabilization box.

12. The electronic device according to claim 8, wherein determining the position of the signal light of the current image, based on the first offset in the observation list of the at least one image stabilization box and the position of the signal light of the template image, further comprises:

in response to determining that the observation list meeting the second preset condition does not include an observation list of a nearest image stabilization box, calculating a mean value of the first offset in the observation list of each image stabilization box of the template image as a second offset between the position of the signal light of the current image and the position of the signal light of the template image, and determining the position of the signal light of the current image, based on the second offset and the position of the signal light of the template image.

13. The electronic device according to claim 12, wherein a number of an observation list meeting the second preset condition is smaller than a number of all observation lists, and the observation list meeting the second preset condition does not comprise an observation list of a nearest image stabilization box of the position of the signal light of the template image.

14. The electronic device according to claim 8, wherein the second preset condition is that a length of an observation list is not smaller than a preset length threshold.

15. A non-transitory computer readable storage medium, storing computer instructions, wherein the computer instructions, when executed by a computer, cause the computer to perform operations comprising:

calculating, for a current image in an image sequence, a first offset between each image stabilization box of the current image and a corresponding image stabilization box of at least one image stabilization box of a template image;

adding a first offset meeting a first preset condition to an observation list of the corresponding image stabilization box of the template image until there is an observation list meeting a second preset condition, the first preset condition being that the first offset is not greater than a preset offset threshold; and determining a position of a signal light of the current image, based on the first offset in the observation list of the at least one image stabilization box and a position of a signal light of the template image;

wherein the operations further comprise: determining whether each observation list meets the second preset condition, and determining a position of a signal light of the current image, based on the first offset in the observation list of the at least one image stabilization box and a position of a signal light of the template image further comprises:

in response to determining that at least one observation list does not meet the second preset condition, determining whether the observation list meeting the second preset condition includes an observation list of a nearest image stabilization box;

in response to determining that the observation list meeting the second preset condition includes an observation list of a nearest image stabilization box, selecting a nearest image stabilization box of the position of the signal light of the template image;

calculating a mean value of the first offset in the observation list of the nearest image stabilization box as a second offset between the position of the signal light of the current image and the position of the signal light of the template image; and determining the position of the signal light of the current image, based on the second offset and the position of the signal light of the template image.

16. A computer program product stored in a non-transitory storage medium and the computer program product comprising a computer program, wherein the computer program, when executed by a processor, implements the method according to claim 1.

17. A roadside device, comprising the electronic device according to claim 8.

18. A cloud control platform, comprising the electronic device according to claim 8.

* * * * *